Figure 1:
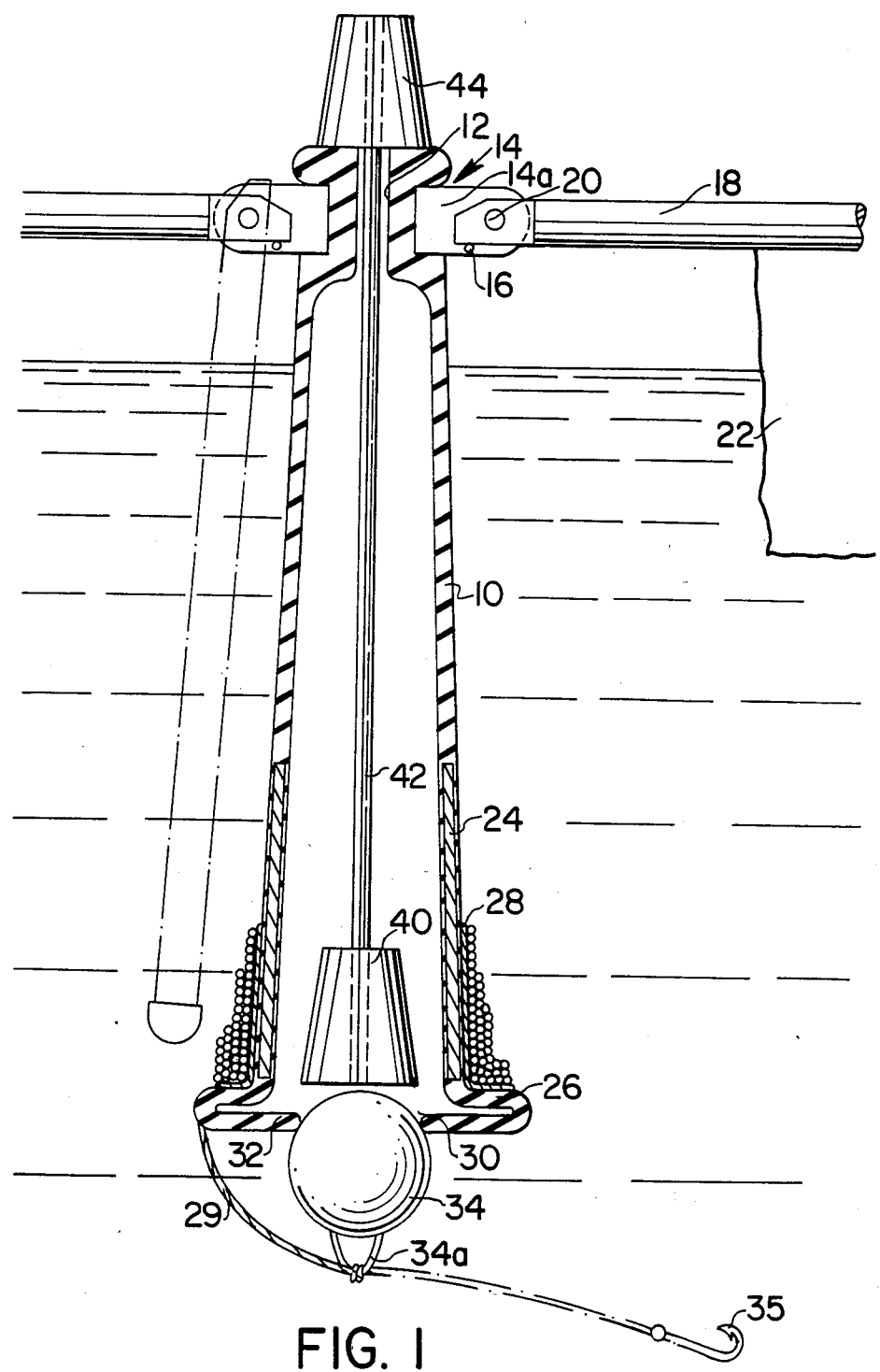

United States Patent [19]

Maerz

[11] Patent Number: 4,565,024

[45] Date of Patent: Jan. 21, 1986

[54] ICE FISHING DEVICE

[76] Inventor: Leslie R. Maerz, P.O. Box 1612, Stony Plain, Alberta T0E 2G0, Canada

[21] Appl. No.: 544,852

[22] Filed: Oct. 24, 1983

[30] Foreign Application Priority Data

Dec. 30, 1982 [CA] Canada .................................. 418761

[51] Int. Cl.⁴ ............................................. A01K 97/12
[52] U.S. Cl. ....................................... 43/17; 43/43.11
[58] Field of Search ........................... 43/17, 16, 43.11

[56] References Cited

U.S. PATENT DOCUMENTS

| | | | |
|---|---|---|---|
| 2,170,000 | 5/1938 | Eggleston | 43/17 |
| 2,198,286 | 4/1940 | Krivutza | 43/17 |
| 2,587,190 | 2/1952 | Merriweather | 43/17 |
| 2,693,046 | 11/1954 | Langevin | 43/17 |
| 2,936,541 | 4/1959 | Stanford | 43/17 |
| 2,955,374 | 10/1960 | Matzo et al. | 43/16 |
| 2,999,328 | 9/1961 | Revord | 43/17 |
| 3,196,570 | 7/1965 | Borisch | 43/17 |
| 3,352,048 | 11/1967 | Fleming | 43/17 |
| 4,246,716 | 1/1981 | Elmer | 43/17 |

FOREIGN PATENT DOCUMENTS 221632  7/1968  Sweden .................................. 43/17

Primary Examiner—Gene P. Crosby
Attorney, Agent, or Firm—Parkhurst & Oliff

[57] ABSTRACT

An ice fishing device including a tubular body with suspension arms movable to project radially from the upper end of the body for supporting the body in an ice fishing hole with a lower, major portion of the body submerged. The lower end of the body forms a spool holding a fishing line which can be pulled off the spool with very little force. The bottom end of the body has an opening which is normally closed (to exclude water from the interior of the body) by a float attached to the fishing line near to the hook end, the float being fairly small so that when a fish takes the hook the float is pulled away from the opening to admit water into the body, without imposing any jerking on the line which would be noticeable to the fish. A buoyant member inside the body is attached by a rod to indicating means which normally rests on the top end of the tubular body, and when the removal of the float allows water to enter the body the buoyant member rises and thus lifts the indicating means to a position where it can easily be noticed.

15 Claims, 3 Drawing Figures

ICE FISHING DEVICE

The present invention relates to a device for ice fishing.

Various devices have been proposed for suspending a fish hook on a line at a suitable distance below an ice fishing hole and for signalling to the fisherman that a fish has taken the bait. A fairly typical device is that of Canadian Patent Number 729,866, which issued Mar. 15, 1966 to Borisch. This includes suspension means which engage the ice at the sides of the hole, a normally submerged reel for the fishing line, and an indicating mechanism tripped by a ring tied to the fishing line, the arrangement being such that the ring moves a lever prior to being pulled off the lever when a fish has taken the hook, movement of the lever releasing the indicating mechanism which then raises a flag. With such a device, and to the best of my belief with all previously known devices, there is inevitably a sudden jerk in the line which is communicated to the fish and in many cases causes the fish to spit out the hook with the bait.

The idea which forms the basis of my invention is to keep the fish unaware that he has taken a hook and a line until he swallows the hook with the bait. Thus, and unlike in many fishing procedures, I avoid trying to set the hook in the fish's mouth by jerking the line, since in my experience, at least where a small hook is used, this oftens pulls the hook. With my method, I can use a small hook which is not obvious to the fish, and nevertheless securely catch the fish since he swallows the hook with the bait.

In accordance with the present invention, an ice fishing device comprises a hollow body with means for suspending the body in an ice fishing hole with at least a portion of the body below water level, this portion of the body having an opening into an interior space within the body, and a closure is provided for the opening capable of normally preventing ingress of water into the space in the body when the said body portion is submerged. Means are provided vertically movable within the interior space in response to entry of water through the opening, the vertically movable means being connected to indicating means visible from above the ice fishing hole at least when there is water in the interior space at a level similar to that outside the body. Also, a fishing line is held by the body so as to be easily pulled therefrom, this line being operatively connected to the closure to cause displacement thereof when the line is pulled by a fish, thus allowing water to enter the previously empty interior space of the body and causing the vertically movable means to rise so that the indicating means signals that the line has been pulled.

Preferably, the body is tubular and has the suspension means connected near to a top end of the body, the opening being at the bottom end. With such an arrangement, the pressure of water against the submerged opening will keep a closure member pressed against the opening to seal it, provided that the body remains empty, even if the closure is not itself buoyant. Conveniently, however, the closure is a float having a buoyancy which assists in keeping it pressed against the opening, and which is easier to hold against the opening while the device is being placed in the ice fishing hole.

The vertically movable means may be any kind of device which will rise in response to entry of water into the body, and for example some kind of piston arrangement might be contemplated, were it not for some possible problems with icing up. For convenience I prefer to use a buoyant member or float such as a cork bottle stopper which occupies a cross sectional area less than that of the interior space within the body, and preferably much less, so as to be freely movable therein at all times even if some ice has gathered on the interior of the body The indicating means may be connected to such a buoyant member by a rod extending upwardly from the buoyant member, and passing through a restricted neck opening at the upper end of the body, the indicating means normally resting on the top end of the body until lifted by the buoyant member.

An important feature of the invention is that the line should be very easily pulled from the stowed position on the body, and for this purpose it is preferably stowed on a static spool rather than on a rotatable reel. Conveniently, the bottom end portion of the body above and co-axial with the opening is in the form of a spool which normally carries most of the length of the line, this spool having a smooth surface to allow the line to pull off easily.

Figure 2:
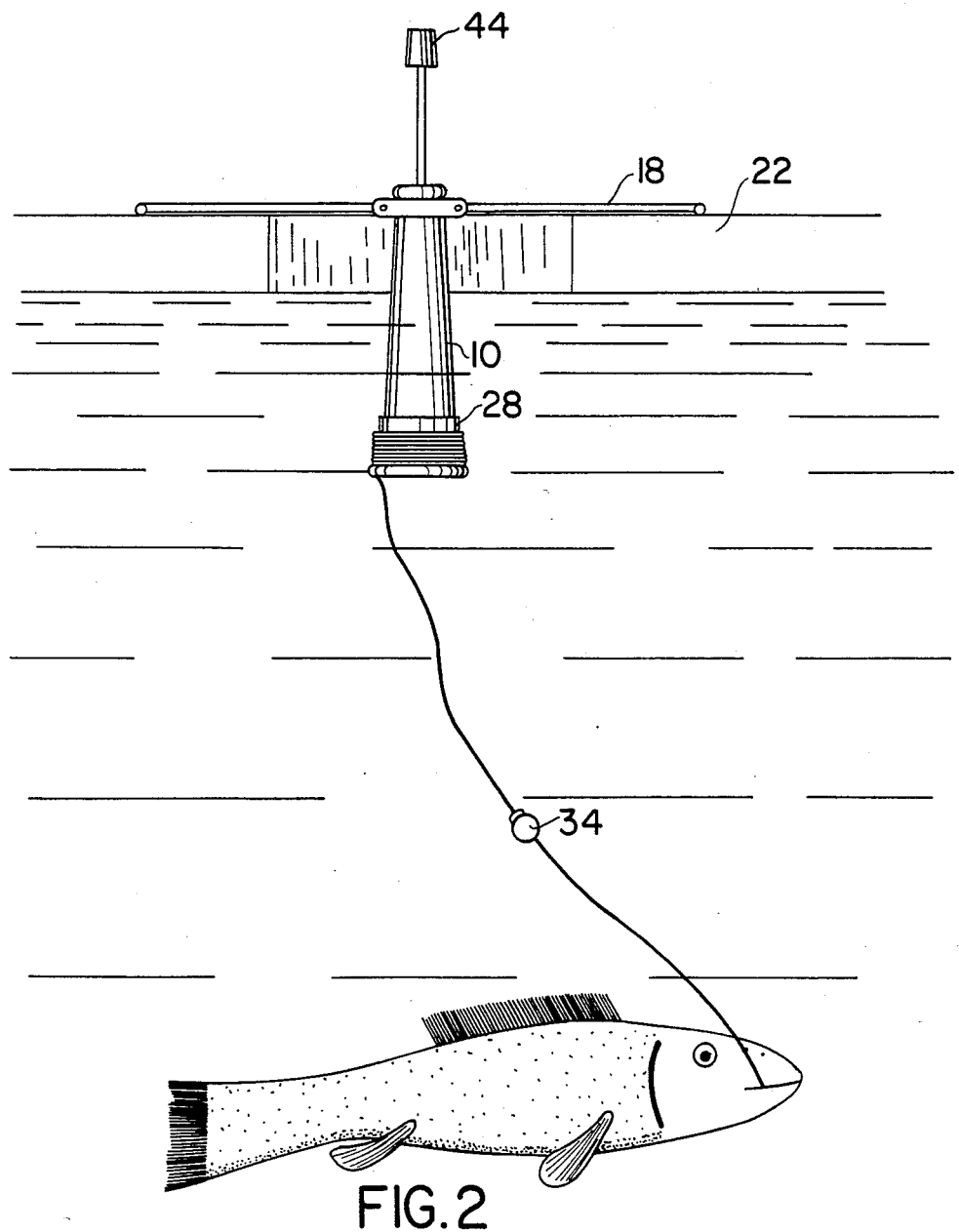
Figure 3:
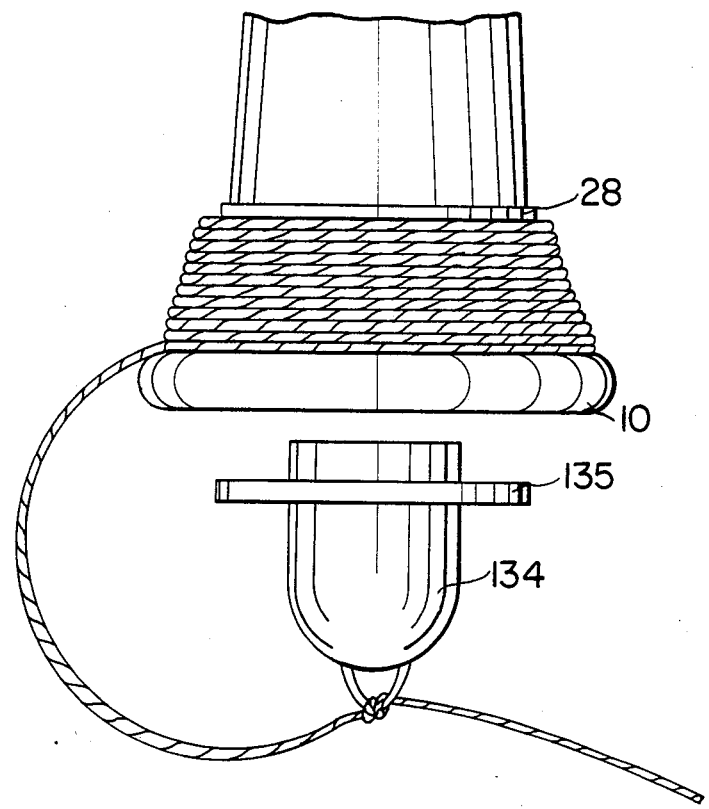

The invention will be described in more detail with reference to the accompanying drawings, in which;

FIG. 1 shows a sectional elevation of the device as set up in an ice fishing hole in preparation for a fish taking the bait, FIG. 2 shows an elevation on a reduced scale of the device when the fish has taken the hook, and FIG. 3 shows a view of the bottom end of the device with a modified float.

As shown in FIG. 1, the device includes a tubular body 10 formed of rubber, having a length which will always be at least say five inches and is preferably between six and eight inches. The upper end of the body has a restricted neck opening 12 provided within an annually recessed area which receives the U-shaped parts of two bridging members 14 which also have radially extending portions 14a held together by two small screws 16. These screws also form stops for the inner ends of two suspension arms 18 pivotally mounted between the ends of the members 14 by screws 20. The arms 18 are preferably formed of plastics, fishing rod material fibre glass or have a plastics covering over steel, since bare metal is preferably avoided on parts of the device which need to be handled at low temperatures. The arms are pivotable from a folded position alongside the body (as indicated in broken lines in the left hand side of FIG. 1) to an operative position in which the arms project perpendicularly to the body axis for engagement with an ice surface 22 surrounding the ice fishing hole in which the body 10 is suspended.

The lower end of body 10 includes a generally cylindrical metal (preferably lead) weight 24 embedded in the rubber material, and which is effective to maintain the normally vertical orientation of the body 10. The outer surface of the lower end of the body is flared at 26, and the portion of the outer surface of the body just above this flared portion (for an inch or more) forms a static spool 28 for a fishing line 29 which is coiled around the spool and attached at an inner end to the body. The portion of the body forming the spool has a covering of smooth plastics which imposes minimum friction on the line, and the flared portion 26 has a convex curvature which smoothly guides the line when this is pulled off downwards, the whole arrangement being such that very little force is required to pull off the line.

The spool 29 is co-axial with an opening 30 at the bottom end of the body which is defined by an inwardly projecting flexible annular flap 32 integral with the body 10. The opening 30 is adapted to be sealed to normally prevent ingress of water into the body by a generally spherical float 34 attached to line 29 near to the outer end of the line which is provided with fish hook 35. The line is looped around and through a pierced extension 34a of the float, in such a way as to allow easy adjustment of the position of the float on the line. The float has a buoyancy which contributes to keeping it pressed against the flap 32, but its size and buoyancy is chosen so that a fish needs only exert very little force to displace the float from the opening. Typically, the float is about 1" in diameter, and its distance from the hook 35 depends on the depth of water but is such as to hold the hook about 18" off the bottom of the lake.

Freely movable in body 10 is a buoyant member in the form of a cork bottle stopper 40 (hereinafter referred to as a cork) having a diameter much samller than the inside diameter of body 10 and sized to be insertable via the opening 30. The cork 40 has a bore in which is fixed the lower end of rod 42, this passing upwardly through the restricted neck opening 12 and carrying at its upper end a similarly bored cork 44. Neck opening 12 is large enough to allow free movement of the rod 42 at all times (even with a slight amount of ice), and the length of rod is such that with the cork 44, which forms indicating means, resting on the upper end of the body 10, the lower cork 40 is suspended just above the opening 30 but clear of a float closing this opening.

In operation, the line 29 is coiled on spool 28 leaving sufficient length uncoiled for the float 34 to be positioned as shown in the opening 30. The device is positioned in an ice hole as shown, with the body 10 initially empty, and with float 34 sealing the opening 30 against entry of water. The device is of course positioned so that the upper cork 44 is visible at least when raised a significant amount on the end of rod 42.

When the fish takes the bait, and begins to move away from the hole, the float 34 is dislodged from opening 30, although as indicated the float, and its relationship with the opening, is such that this does not produce any sudden jerking in the line such as might alarm the fish. Water then enters opening 30, causing the lower cork 40 to rise lifting with it the upper cork 44 on rod 42 into a position in which it signals to the fisherman that a fish has taken the bait. The fish continues to swim away with the bait and hook, and with the line uncoiling from the spool 28 with such little resistance that the fish is not alarmed and does not spit out the bait. Since the spool is submerged, there is no icing problem here such as would retard the unspooling of the line. Also, it is a feature of the device that it can tilt slightly about the axis of suspension arms 18 so that the line can unspool easily even if the fish swims away at a fairly large angle to the vertical direction. On seeing the indicating cork 44 pop up, the fisherman approaches the device and carefully lifts this out of the water with one hand while being careful to allow the line to continue to run off the spool, assuming that the fish is still swimming away. The fisherman then takes the line in his free hand while allowing this still to pull away. Consequently, the fisherman will feel jerks on the line which indicates that the fish is preparing to swallow the bait. When the fish starts again to swim away, this indicates he has swallowed the bait and at this point the fisherman jerks the line to set the hook. If after swallowing the bait the fish moves towards the hole, then the fisherman waits until he is swimming away again since with the fish facing the hole there is a chance of pulling the hook out of the mouth. Having hooked the fish, the fisherman then plays the fish to draw him to the hole without subjecting the line to enough tension to pull the hook out of the fish. It may be borne in mind that this whole fishing procedure is intended to operate with a small hook, so that the danger of pulling out or straightening the hook is always present. However, with normal skill the fish can be played until the float comes through the hole indicating that the fish is near, and the fish is then removed from the hole by usual means.

Many changes may be made in the details of the device described without departing from the scope of the invention as defined in the claims. For example, it may be advantageous to make the body 10 of plastics rather than rubber; this would provide a suitable surface for the spool although it would necessitate that flap 32 be part of a rubber plug inserted into the lower end of the body 10.

Another possible variation of the device would be to use three arms for suspension instead of two, in which case it may not be necessary to use a weight to hold the device vertical. However, I prefer the two arm design, since this allows the body to tilt, facilitating unspooling of the line as described.

The float 34 as described is a standard fishing float, but instead of this it may be advantageous to use a specially designed float, which is illustrated in FIG. 3. This float 134 has a flange 135 which seals against the bottom end of the body, and with suitable precision in making the float it may not be necessary to use any special rubber part such as the flap 32 at the bottom of the body. Principally, however, the use of a flange as shown would facilitate positioning of the float and holding this in position while the device is located in the hole.

The embodiments of the invention in which an exclusive property or privilege is claimed are defined as follows:

1. An ice fishing device comprising:
    a hollow body with means for suspending said body in an ice fishing hole with at least a portion of said body below water level, said body having an opening at the bottom and the top into an interior space within the body,
    a bouyant, movable closure for said bottom opening capable of normally preventing ingress of water into said space when said body portion is submerged,
    means vertically movable, by means of buoyancy, within said space in response to entry of water through said bottom opening, said vertically movable means being connected through the top opening to indicating means visible above the ice fishing hole at least when there is water in said interior space at a level similar to that outside the body, and
    a fishing line held axially coiled about said body near the bottom thereof substantially centrically combined with said bottom opening so as to be pulled easily therefrom without the necessity of body rotation, said line being operatively connected to said bottom closure to cause displacement thereof when the line is pulled by a fish, thus allowing water to enter the previously empty interior space of said body, thereby causing the vertically movable means to rise due to its buoyancy so that the indicating means signals that the line has been pulled by a fish.

2. A device in accordance with claim 1, wherein said body is tubular and has said suspension means connected thereto near to a top end of the body.

3. A device according to claim 2, wherein said bottom closure is a float normally held against said bottom opening partially by the inherent buoyancy of the float, said float being connected to the line to be pulled away from the opening when the line is pulled by a fish.

4. A device according to claim 1, wherein said body is tubular, and wherein said vertically movable means is a buoyant member occupying a cross-sectional area less than that of the interior space within said body so as to be freely movable therein in response to ingress of water into said space.

5. A device according to claim 4, wherein said indicating means is connected to said buoyant member by a rod extending upwardly from said buoyant member and passing through a restricted neck opening at the upper end of said body, said indicating means normally resting on the top end of said body until said buoyant member is lifted by ingress of water into the body.

6. A device according to claim 1, wherein said line is spooled on a bottom end portion of the body.

7. A device according to claim 1, wherein said suspending means comprises two arms pivotally connected to an upper end portion of the body and movable into an operative position in which the arms project substantially perpendicularly to the body axis for engagement with an ice surface surrounding the ice fishing hole.

8. A device according to claim 1, wherein said body member is tubular and is formed of resilient material.

9. An ice fishing device comprising:
a hollow; tubular body of at least five inches in length and having a lower end provided with an opening into the interior space thereof,
A lower end portion of the body serving as an axial spool means having said opening substantially concentric therewith and a fishing line spooled thereon for easy axial removal,
suspension means capable of projecting radially from adjacent an upper end of the body to engage an ice surface surrounding an ice fishing hole and to hold said body with a lower end portion thereof submerged,
a float suitable for sealing said opening against ingress of water when the lower end portion of the body is submerged, said float being connected to said line near to an end of the line carrying a fishing hook,
A buoyant member freely movable in said body, said member being connected to indicating means visible above the ice fishing hole at least when there is water in said interior space at a level similar to that outside the body, whereby when a fish pulls the line the float is removed from the opening and allows water to flow into said interior space, thereby lifting the buoyant member and lifting said indicating means to show that a fish has taken the hook.

10. A device according to claim 9, wherein said buoyant member is connected to said indicating means by a rod projecting through a restricted neck opening at the upper end of the body, said rod being of such length that with the indicating means resting on the top end of the body said buoyant member is suspended near the bottom end of the tubular body, but above the opening.

11. A device according to claim 9, wherein said body is formed of resilient material and said spool has a smooth outer surface.

12. A device according to claim 9, wherein said body further comprises a metal weight adjacent the bottom end thereof.

13. A device according to claim 9, wherein said suspension means comprises two suspension arms extending on opposite sides of the tubular body.

14. A device according to claim 13, wherein said suspension arms are pivoted so as to be foldable along the tubular body.

15. An ice fishing device comprising:
a hollow body with means for suspending said body in an ice fishing hole with at least a portion of said body below water level, said body having an opening at the bottom and the top into an interior space within the body,
a buoyant, movable closure for said bottom opening capable of normally preventing ingress of water into said space when said body portion is submerged,
means vertically movable, by means of buoyance, within said space in response to entry of water through said bottom opening, said vertically movable means being connected through the top opening to indicating means visible above the ice fishing hole at least when there is water in said interior space at a level similar to that outside the body, and
a fishing line held by said body near the bottom thereof so as to be pulled easily therefrom without the necessity of body rotation, said line being operatively connected to said bottom closure to cause displacement thereof when the line is pulled by a fish, thus allowing water to enter the previously empty interior space of said body and causing the vertically movable means to rise due to its buoyance so that the indicatng means signals that the line has been pulled by a fish,
said body being tubular and having said suspension means connected thereto near to a top end of the body,
said body having a bottom end portion above and co-axial with the opening in the form of a spool which normally carries most of the length of said line, said spool having a smooth surface to allow the line to pull off easily.

* * * * *